United States Patent
Treige

(10) Patent No.: US 6,325,574 B1
(45) Date of Patent: Dec. 4, 2001

(54) MACHINING SLOT CUTTER WITH REMOVABLE CARTRIDGES

(76) Inventor: Peter J. Treige, 11 Insight Dr., Platteville, WI (US) 53818

( * ) Notice: Subject to any disclaimer, the term of this patent is extended or adjusted under 35 U.S.C. 154(b) by 0 days.

(21) Appl. No.: 09/783,686

(22) Filed: Feb. 14, 2001

(51) Int. Cl.[7] .............................. B23B 27/00; B23P 15/34
(52) U.S. Cl. ................................ 407/35; 407/38; 407/43; 407/46
(58) Field of Search ................................ 407/33, 34, 35, 407/36, 37, 38, 39, 40, 41, 43, 46, 49, 53

(56) References Cited

U.S. PATENT DOCUMENTS

| | | |
|---|---|---|
| 31,073 | 1/1861 | Brown . |
| 103,045 | 5/1870 | Hiles . |
| 141,427 | 8/1873 | Crookes . |
| 146,680 | 1/1874 | Husbands, Jr. . |
| 205,042 | 6/1878 | Brooke . |
| 221,602 | 11/1879 | Ohlen . |
| 424,263 | 3/1890 | Bole . |
| 657,873 | 9/1900 | Jewett . |
| 1,700,333 * | 1/1929 | Pond ..................................... 407/36 |
| 2,309,657 * | 2/1943 | Miller ................................... 407/102 |
| 3,163,920 * | 1/1965 | Stier ....................................... 407/40 |
| 3,584,361 * | 6/1971 | Erkfritz ................................... 407/41 |
| 3,798,724 * | 3/1974 | Czopor ................................... 407/93 |
| 4,078,868 * | 3/1978 | Erkfritz ................................... 407/48 |
| 4,257,302 | 3/1981 | Heimbrand . |
| 6,056,484 * | 5/2000 | Mitchell et al. ........................ 407/36 |

OTHER PUBLICATIONS

1 Page drawing and description of Type I prior art provided by Applicant.
1 Page drawing and description of Typ 2 prior art provided by Applicant.

* cited by examiner

Primary Examiner—Henry Tsai
(74) Attorney, Agent, or Firm—John V. Stewart

(57) ABSTRACT

A cartridge just large enough to hold a cutter tooth and a setscrew. The cartridge has an open-sided tap for the setscrew, exposing part of a side of the setscrew. A cutter body has a slot to receive the cartridge. The slot has a leading side with a generally cylindrical smooth wall portion that surrounds the exposed side of the setscrew. The cylindrical concave portion is uniquely angled to wedge the setscrew firmly against the cylindrical concave portion as the setscrew is tightened, and to force the cartridge against the bottom and trailing side of the slot. The cartridge and slot have parallel interlocking interfaces on both their leading and trailing sides. These are slidable interlocks, allowing the cartridge to slide into the slot while engaging both the leading and trailing interlocks. The setscrew can easily be manually tightened while the interlocks hold the cartridge steady in the slot.

6 Claims, 2 Drawing Sheets

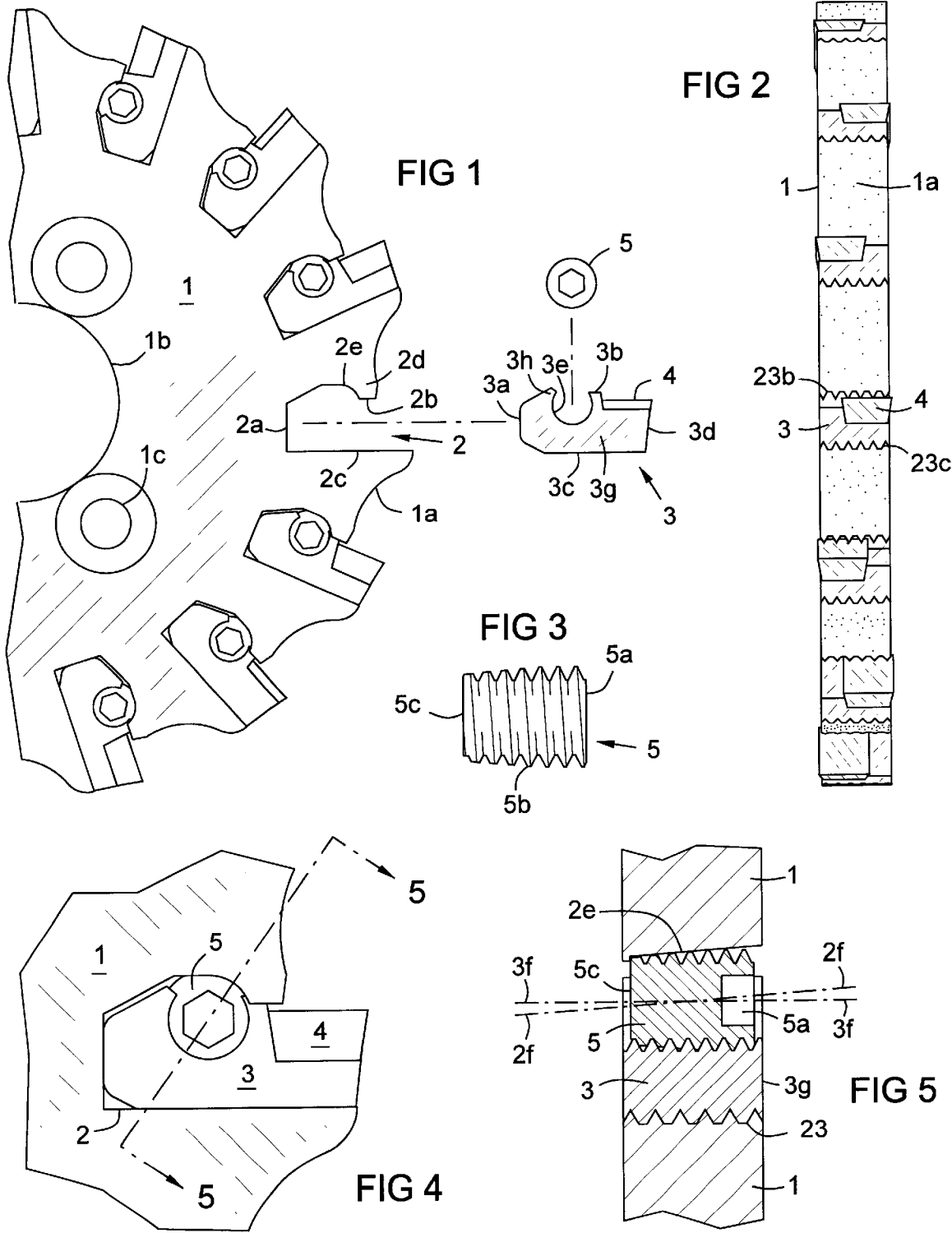

MACHINING SLOT CUTTER WITH REMOVABLE CARTRIDGES

BACKGROUND OF THE INVENTION

1. Field of the Invention

This invention relates to saws and machining slot cutters in which each tooth is mounted in the body of the saw or cutter in a removable cartridge for individual maintenance and replacement of the teeth.

2. Description of Prior Art

Saws and machining slot cutters for commercial and industrial usage sometimes have individually removable tooth cartridges mounted on the periphery of the saw or cutter body. Each cartridge holds one tooth. This allows replacement of teeth without replacement of the cutter body, and makes maintenance of the teeth easier. One disadvantage is the possibility that the cartridge may loosen during operation—an unsafe condition. A second disadvantage is that the cartridge and its mounting mechanism takes space, reducing the maximum number of teeth on the cutter in comparison to non-removable teeth. A third disadvantage is cost, since individual teeth, cartridges, and their associated mounting hardware greatly increase the complexity and number of parts in a cutter in comparison to non-removable teeth. A fourth disadvantage is the effort and skill required to install the cartridges properly in the cutter. Thus, what is needed is a removable cartridge mechanism with minimal size and complexity that is highly secure and easy to install properly. The present invention fills this need.

The following U.S. patents show earlier related inventions:

U.S. Pat. No. 4,257,302 (Heimbrand 1981)
U.S. Pat. No. 424,263 (Bole 1890)
U.S. Pat. No. 221,602 (Ohlen 1879)
U.S. Pat. No. 205,042 (Brooke 1878)
U.S. Pat. No. 146,680 (Husbands, Jr. 1874)
U.S. Pat. No. 141,427 (Crookes 1873)
U.S. Pat. No. 103,045 (Hiles 1870)
U.S. Pat. No. 31,073 (Brown 1861)

For example, Heimbrand provides a cartridge mounted in an open-ended slot that converges toward the open end. The user must insert a cam between the cartridge and the cutter body, hold the cartridge in position, slide a tooth between the cartridge and cutter body opposite the cam, and hold the tooth and cartridge in position while locking the cam. This requires a high degree of manual dexterity. It also requires manual strength, since a cam provides less than 360 degrees of rotation between its loose and tight conditions, and thus cannot provide the high mechanical advantage of a screw. In Heimbrand, if the cam is not fully tightened, or works loose during operation, the tooth can fly out, releasing the cartridge as well.

SUMMARY OF THE INVENTION

An objective of the present invention is a removable tooth cartridge of minimal size in order to maximize the number of teeth on a cutter. A further objective is maximal locking force holding the cartridge in the cutter body. A further objective is safety and stability of the cartridge in the cutter. A further objective is ease, speed, and consistency of positioning and installing the cartridge in the cutter body, and ease and speed of removing the cartridge from the body. Further objectives include minimizing the number of parts and maximizing the practicality and simplicity of production of cutters according to the invention.

These objectives are achieved with a cartridge just large enough to hold a tooth and a setscrew. The cartridge has an open-sided tap for the setscrew that exposes a side of the setscrew. The cutter body has a slot to receive the cartridge. The slot has a leading side with a generally cylindrical smooth concave portion that surrounds the exposed part of the setscrew. The cylindrical concave portion is uniquely angled to wedge the setscrew firmly against the cylindrical concave portion as the setscrew is tightened, and to force the cartridge against the bottom and trailing side of the slot. The cartridge and slot preferably have interlocking interfaces on both their leading and trailing sides. These interfaces are preferably parallel and slidable, allowing the cartridge to slide into the slot while engaging both the leading and trailing interlocks. This allows setscrew to easily be manually tightened with strong force while the interlocks hold the cartridge steady. With the setscrew tightened, the cartridge is firmly forced against the bottom and trailing sides of the slot. The cartridge cannot slip out of the slot even if the setscrew is loose, because the setscrew is blocked by the cylindrical concave portion of the leading side of the slot. Thus secondary retention is provided in the event of a loose setscrew.

BRIEF DESCRIPTION OF THE DRAWINGS

FIG. 1 is a partial frontal exploded view of a machining slot cutter according to the invention in the form of a rotating disk.

FIG. 2 is a side view of the cutter of FIG. 1.

FIG. 3 is an enlarged side view of the setscrew 3.

FIG. 4 is an enlarged frontal view of an assembled cartridge mounted in the cutter body.

FIG. 5 is a partial sectional view taken along line 5—5 of FIG. 4.

REFERENCE NUMBERS

Figure 6:
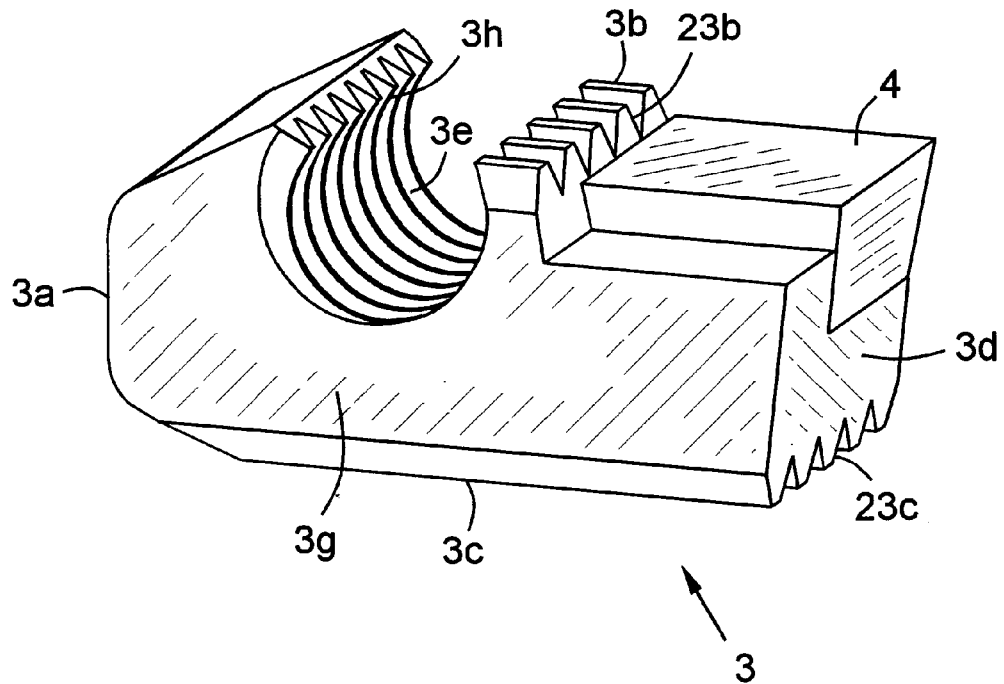
FIG. 6 is a frontal perspective view of a cartridge without the setscrew.
Figure 7:
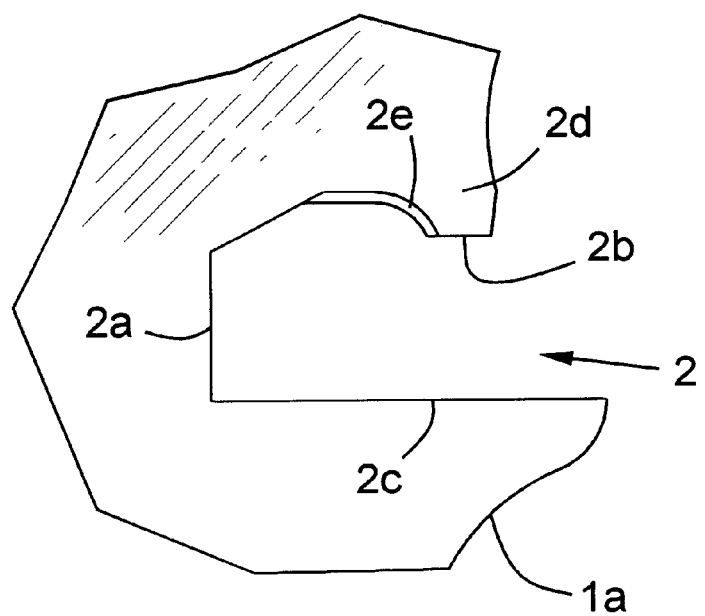
FIG. 7 is an enlarged view frontal of the slot of FIG. 1.

1. Body of cutter
1a. Periphery or edge of cutter body
1b. Hole in cutter body for mounting the drive spindle of the cutter
1c. Bolt holes for connection of the drive spindle to the cutter
2. Slot in periphery of cutter body
2a. Bottom or proximal end of slot
2b. Leading side of slot
2c. Trailing side of slot
2d. Lip in slot
2e. Angled generally cylindrical wall or concave portion on leading side of slot for wedging and locking the setscrew
2f. Axis of generally cylindrical wall or concave portion 2e
3. Cartridge
3a. Proximal end of cartridge
3b. Leading side of cartridge
3c. Trailing side of cartridge
3d. Distal end of cartridge
3e. Open-sided tap or threaded hole in cartridge for setscrew
3f. Axis of tap 3e, and also the axis of setscrew 5 when the setscrew is in the tap.

3g. Front side of cartridge

3h. Proximal wall portion of tap 3e

4. Tooth

5. Setscrew

5a. Front or head of setscrew

5b. Threaded side of setscrew

5c. Back of setscrew

23b. Interlocking interface between leading side of cartridge and leading side of slot 23c. Interlocking interface between trailing side of cartridge and trailing side of slot

DETAILED DESCRIPTION

FIG. 1 shows a partial exploded front view of a cutter disk 1 with removable cartridges 3 according to the invention. Each cartridge holds a cutter tooth 4, and is removable for maintenance or replacement of teeth. Each cartridge is mounted in a slot 2 in the periphery 1a of the cutter. The slot and cartridge are designed to lock firmly together and to resist loosening of the cartridge due to high stress, temperature variations, and vibrations during cutting operations. In addition, the design minimizes the size of the slot and cartridge in order to maximize the number of cartridges that can fit around the periphery of the cutter wheel.

Locking of the cartridge in the slot is done with a setscrew 3 in conjunction with interlocking interfaces 23b and 23c between the cartridge sides and slot sides. These interfaces mate together in tongue-and-groove or track-and-slide fashion. This is most simply and preferably done with a series of parallel ridges and grooves as shown. This allows the cartridges to optionally be inserted into the slots alternately forward and backward by a given number of grooves in the interlocking interfaces to produce a wider cut.

The leading side 3b of the cartridge has a threaded tap 3e for the setscrew. The tap is open-sided, exposing a side of the setscrew. The tap surrounds the setscrew for over 180 degrees so it retains the setscrew. The setscrew can be stored in the tap when the cartridge is separate from the cutter body.

Part of the leading side 2b of the slot 2 is a wall 2e that is concave, generally cylindrical, and smooth. It completes the surround of the setscrew 5 when the cartridge is in the slot. This wall 2e contacts the setscrew at an angle, wedging the setscrew as it is tightened, and providing vectors of force against the setscrew that push the cartridge against the trailing side 2c and the bottom 2a of the slot 2. As shown in FIG. 5 the wall 2e approaches the axis 3f of the tap at the back end of the tap. When the setscrew is tightened in the tap 3e, it jams increasingly against the wall 2e, wedging the setscrew against the wall, and forcing the cartridge hard against the trailing side 2c of the slot. Preferably the angle of the axis of the cylindrical concave portion 2e relative to the axis of the setscrew is about 4–5 degrees.

A lip 2d on the leading side of the slot supports the cylindrical concave portion 2e in an inward or proximally facing angle that blocks the setscrew from outward radial movement. This prevents the cartridge from removal without complete removal of the setscrew. Since the cartridge cannot slide out of the slot radially when the setscrew is in the tap, the leading and trailing interlocking sides of the slot can be parallel. This allows the cartridge without the setscrew to slide into the slot radially, either from the beginning or from a starting position as next described, while interlocking the leading and trailing sides of the slot and cartridge.

The proximal wall 3h of the tap 3e opposes the lip 2d. The main purpose of this wall 3h is to allow the tap to surround the setscrew more than 180 degrees, to retain the setscrew in the cartridge. It also provides opposite force to the radial component of force exerted on the setscrew by the slot leading wall portion 2e. The tap wall portion 3h can preferably extend beyond the end of the lip 2d in the leading direction. Even though this prevents the cartridge from sliding radially into the slot from the beginning, it is easy to place the cartridge in a starting position with wall 3h inward or proximal of wall 2d, with the trailing interface 23c engaged, and slide the cartridge to the bottom of the slot from there, engaging the leading interface 23b.

The setscrew is preferably tapered on the outside of the threads by the same amount as the cylindrical concave portion 2e, preferably about 4–5 degrees per side as shown in FIG. 3, to reduce grooving by the threads into the wall portion 2e. Preferably the wall portion 2e of the slot is hardened to resist grooving by the setscrew threads.

Details of attachment of a tooth 4 to the cartridge 3 are not shown, since these details are known in the art, and are not the subject of this invention. Attachment is preferably done with a screw through the tooth into the cartridge. This allows the tooth to be rotated to a fresh edge when worn, and to be replaced when necessary, without discarding the cartridge. Other attachment means are also known in the art.

To install a cartridge in the cutter body, remove the setscrew 3 from the tap 3e in the cartridge 3 if the setscrew is stored in the tap. Place the cartridge in the slot 2 from the front, with the inward or proximal wall 3h of the tap inward or proximal of slot leading lip 2d and the trailing interlocking interface 23c engaged. Slide the cartridge radially inward to the bottom of the slot. The interlocking leading interface is now engaged, holding the cartridge in position during tightening of the setscrew. When the cartridge is fully inserted into the slot, thread the setscrew 5 into the tap, and tighten it until its head is flush or below the front surface 3g of the cartridge, and turning resistance on the screw is high. The cartridge is now firmly locked into the slot, and cannot separate from it even if the setscrew is loosened, as long as the setscrew is not completely removed.

To remove a cartridge from the cutter body. Remove the setscrew 5, and slide the cartridge radially out of the slot.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention. The cutter body is shown herein in the form of a rotating disk. However, the present invention can also be applied to reciprocating saws and chain saws.

I claim:

1. A cutter comprising:
   a setscrew;
   a cartridge to hold a tooth and the setscrew, the cartridge having a leading side, a trailing side, and an open-sided tap for the setscrew, exposing a side of the setscrew when the setscrew is threaded into the tap; and
   a cutter body with an open-ended slot to receive the cartridge, the slot having a bottom, a leading side, and a trailing side, the leading side of the slot having a generally cylindrical concave portion that surrounds the exposed side of the setscrew when the cartridge is in the slot and the setscrew is in the tap, the cylindrical concave portion angled to wedge the setscrew increasingly against the cylindrical concave portion as the setscrew is tightened, and further angled to force the cartridge against the bottom and trailing side of the slot as the setscrew is tightened;

whereby the cartridge is placed in the slot, and the setscrew is manually tightened, forcing the cartridge firmly against the bottom and trailing sides of the slot.

2. The cutter of claim 1, further comprising:

a first slidable interlocking interface between the leading side of the slot and the leading side of the cartridge; and a second slidable interlocking interface between the trailing side of the slot and the trailing side of the cartridge, the first and second interlocking interfaces being substantially parallel, allowing the cartridge to slide into the slot from a starting point while engaging both the first and second interlocking interfaces;

whereby the cartridge can be slid into the slot between the first and second interlocking interfaces from a starting point, the setscrew can be manually tightened while the interlocking interfaces hold the cartridge steady in the slot, and the tightened setscrew forces the cartridge firmly against the bottom and trailing sides of the slot.

3. A cutter comprising:

a cutter body with a front surface, a back surface, and a periphery with an open-ended slot having a bottom or proximal side, a leading side, and a trailing side;

a cartridge that fits closely in the slot and carries a cutter tooth, the cartridge having a front surface, a back surface, a leading side adjacent the leading side of the slot, a trailing side adjacent the trailing side of the slot, a proximal end adjacent the bottom of the slot, and a distal end that holds the cutter tooth;

a hole passing between the front and back sides of the body and cartridge, partly in the leading side of the cartridge and partly in the leading side of the slot;

the portion of the hole in the cartridge being generally cylindrical with a first axis, having helical threads to receive a setscrew;

a setscrew threaded in the portion of the hole in the cartridge; and the portion of the hole in the leading side of the slot being a generally cylindrical wall that approaches the first axis toward the back surface of the cartridge, the wall oriented to contact a side of the setscrew that is generally opposite the trailing side of the slot and the bottom of the slot, providing a force against the setscrew toward the trailing side of the slot and the bottom of the slot when the setscrew is tightened into the threaded portion of the hole;

whereby inserting the cartridge in the slot and tightening the setscrew in the threaded portion of the hole causes the cartridge to be firmly locked against the bottom and trailing side of the slot.

4. The cutter of claim 3, further comprising a first interlocking slidable interface between the leading side of the slot and the leading side of the cartridge, and a second interlocking slidable interface between the trailing side of the slot and trailing side of the cartridge, the first and second interlocking interfaces being substantially parallel to each other.

5. A cutter comprising:

a cutter body having a front surface, a back surface, and an edge;

a slot in the edge of the body having a bottom or proximal side, a leading side, and a trailing side;

a removable cartridge comprising a block that fits in the slot, the block having a front and a back surface, an outer or distal end, an inner or proximal end adjacent the bottom of the slot, a leading side adjacent the leading side of the slot, a trailing side adjacent the trailing side of the slot, and a threaded tap through the block between the front and back surfaces of the block, intersecting the leading side of the block so the tap causes a gap in the leading side of the block;

a setscrew in the tap with a side protruding from the gap in the leading side of the block, the setscrew having a front end or head, and a back end; and a lip protruding from the leading side of the slot toward the trailing side of the slot, the lip having a wall with a generally cylindrical surface contacting a distal leading portion of the protruding side of the setscrew, and angled to approach the setscrew at the back end of the setscrew, so that tightening the screw wedges the screw tightly between the lip and the block and pushes the setscrew and block toward the bottom and trailing side of the slot when the setscrew is tightened;

whereby inserting the block in the slot and tightening the setscrew in the tap causes the block to be firmly locked against the bottom and trailing side of the slot.

6. The cutter of claim 5, further comprising a first interlocking slidable interface between the leading side of the slot and the leading side of the cartridge, and a second interlocking slidable interface between the trailing side of the slot and trailing side of the cartridge, the first and second interlocking interfaces being substantially parallel to each other.

* * * * *